July 14, 1964  E. V. ABBOTT ETAL  3,140,875
DEVICE FOR MAKING RANDOM SELECTIONS
Filed Oct. 5, 1961  11 Sheets-Sheet 5

INVENTOR.
Elbert V. Abbott
John W. Heaston
BY
Attorneys

July 14, 1964  E. V. ABBOTT ETAL  3,140,875
DEVICE FOR MAKING RANDOM SELECTIONS
Filed Oct. 5, 1961  11 Sheets-Sheet 8

INVENTOR.
Elbert V. Abbott
BY  John W. Heaston
Attorneys

July 14, 1964     E. V. ABBOTT ETAL     3,140,875
DEVICE FOR MAKING RANDOM SELECTIONS Filed Oct. 5, 1961     11 Sheets-Sheet 9

INVENTOR.
Elbert V. Abbott
BY    John W. Heaston

Attorneys

July 14, 1964   E. V. ABBOTT ETAL   3,140,875
DEVICE FOR MAKING RANDOM SELECTIONS
Filed Oct. 5, 1961   11 Sheets-Sheet 10

INVENTOR.
Elbert V. Abbott
John W. Heaston
BY
Attorneys

July 14, 1964   E. V. ABBOTT ETAL   3,140,875
DEVICE FOR MAKING RANDOM SELECTIONS
Filed Oct. 5, 1961   11 Sheets-Sheet 11
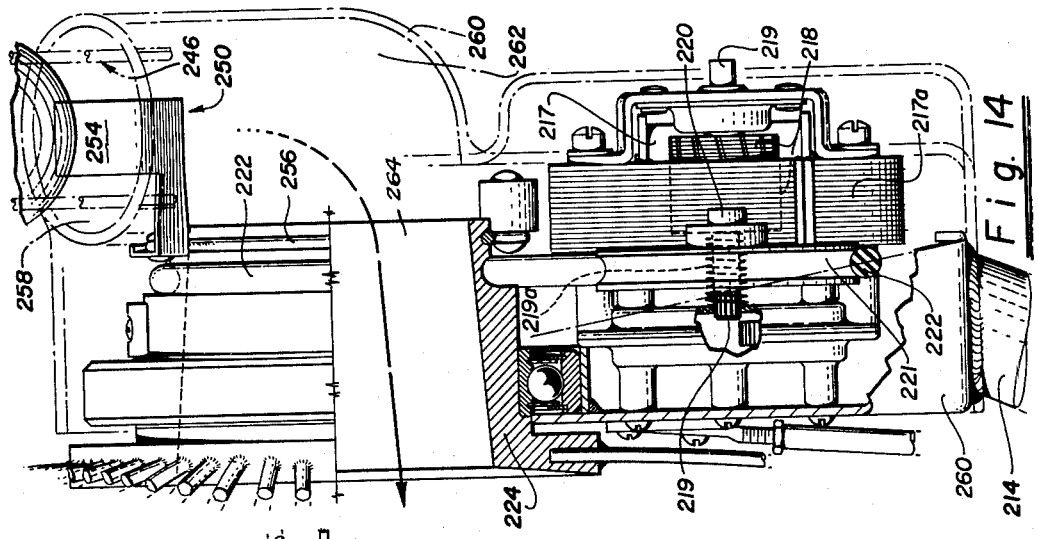
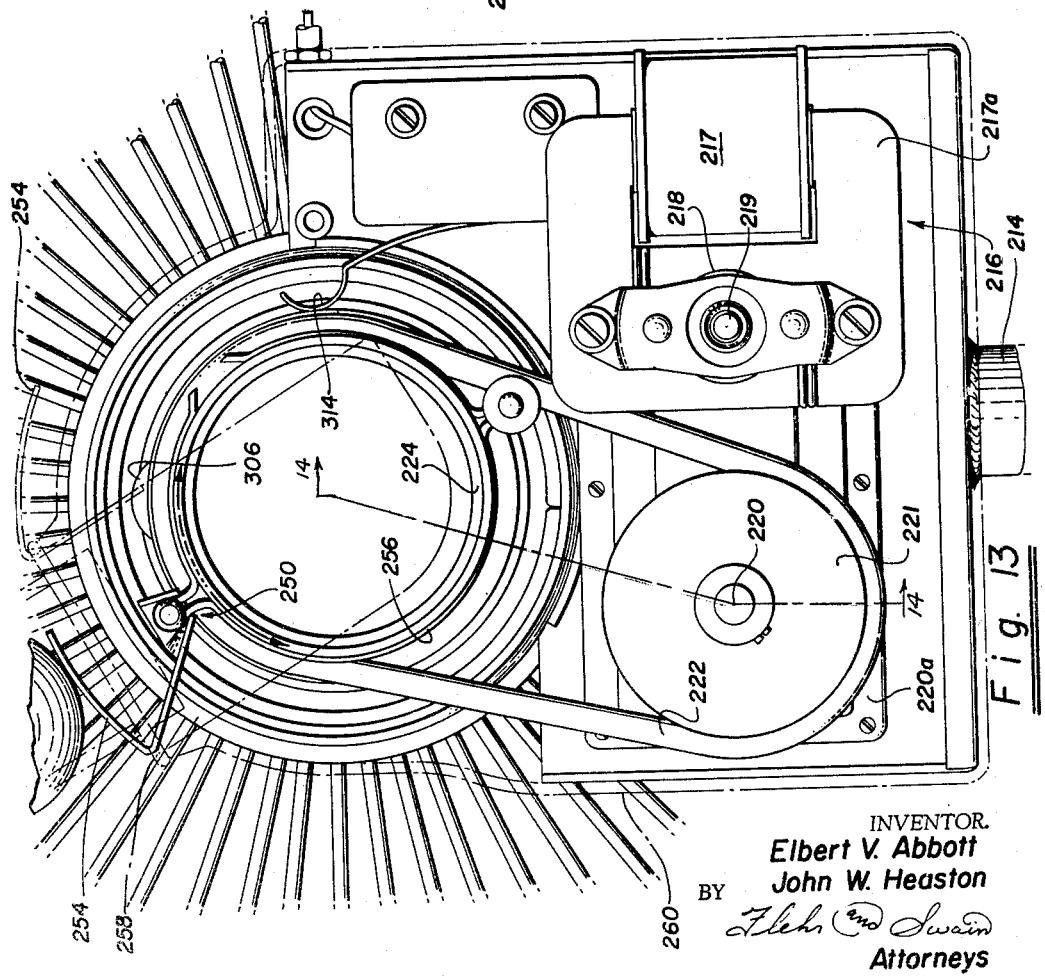
INVENTOR.
Elbert V. Abbott
John W. Heaston
BY
Attorneys

United States Patent Office 3,140,875
Patented July 14, 1964

3,140,875
DEVICE FOR MAKING RANDOM SELECTIONS
Elbert V. Abbott, San Francisco, Calif., and John W. Heaston, 1080 Golconda, Reno, Nev.; said Abbott assignor to said Heaston
Filed Oct. 5, 1961, Ser. No. 143,154
20 Claims. (Cl. 273—144)

This invention relates to devices for the random selection or sampling of units from a plurality of such units, and more particularly to a device by which units can be selected in predetermined number, held for display, and then returned to the device. This application is a continuation-in-part of our previously filed application Serial No. 840,177, filed September 15, 1959, now abandoned.

The present invention is intended to provide a substantially automatic device for obtaining a desired number of random selections in this fashion. Devices of the type disclosed can be used in statistical studies, by selection boards such as placement bureaus, draft boards, and the like, and in various amusement activities including games wherein a random "drawing" of units is a factor. Examples of games in the latter category are "Bingo," "Keno," and similar games.

It is an object of the present invention to provide a substantially automatic device for such purposes by which the random selection of units in predetermined number can be obtained rapidly and efficiently and completely independently of human control.

It is another object of the invention to provide a device of such character that is capable of performing a completely automatic "draw" cycle, involving the random selection of a predetermined number of units, and which will retain the drawn units in a display position.

It is a further object of the invention to provide a device of such character capable of making a completely random selection, and which will provide for a thorough mixing of units prior to selection.

Other objects and advantages of the invention will appear from the following description of an illustrative embodiment, and from the drawings in which:

FIGURE 13 is a detail view of the hub portion of the modified machine (with the outer casing removed), showing separate stages in the operation of the gate means;

FIGURE 14 is a view in vertical section along the line 14—14 of FIGURE 13; and

Figure 1:
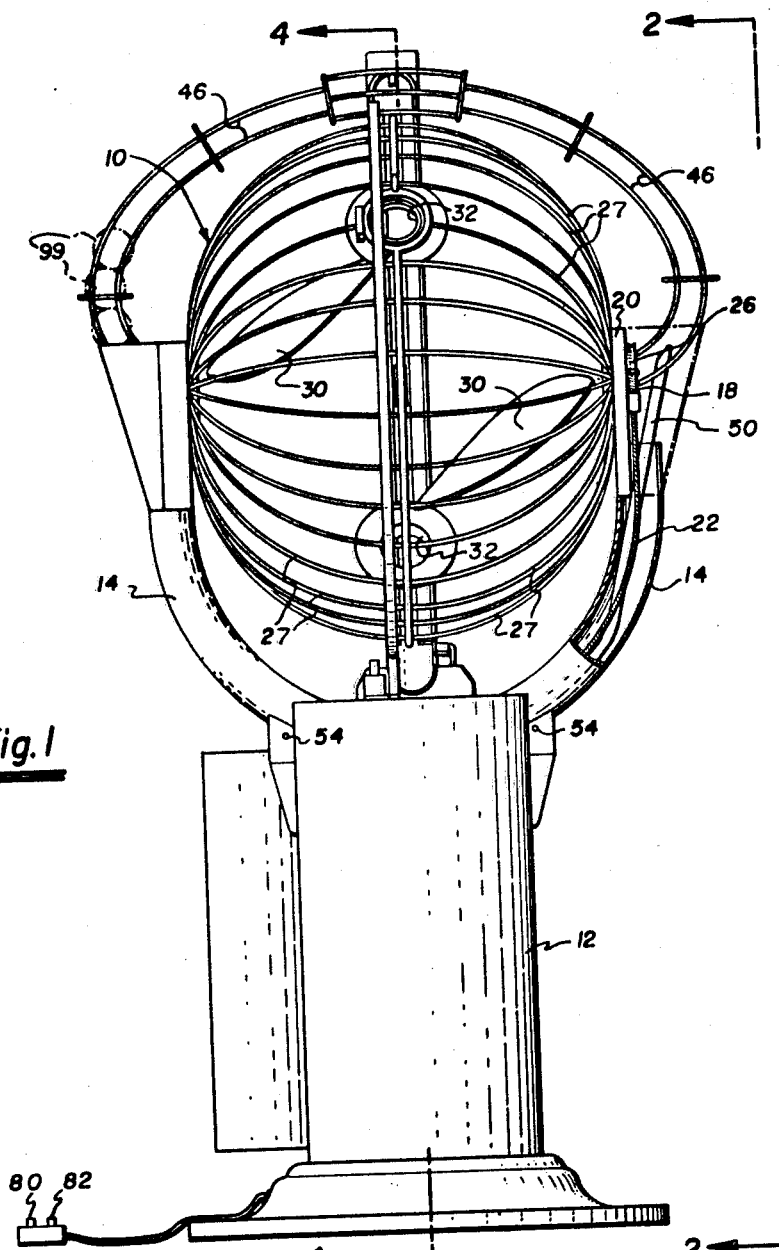
FIGURE 1 is a view in front elevation of one embodiment of the invention.
Figure 2:
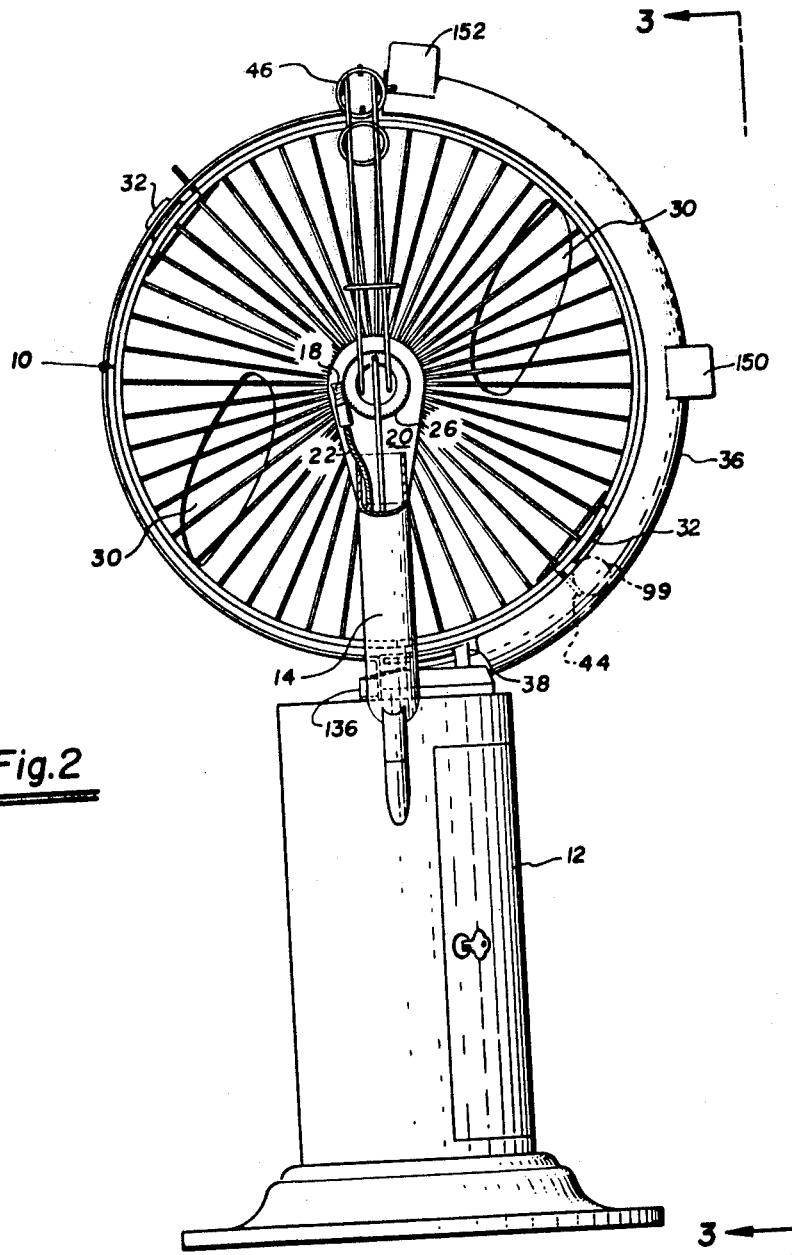
FIGURE 2 is a view in side elevation thereof taken along the line 2—2 of FIGURE 1.

Generally stated, the present invention is drawn to a rotating cage or mixing device adapted to contain a plurality of identifiable units, and to means for the random selection and withdrawal of a predetermined number of such units. Preferably the units are spherical in shape and are distinguishable from one another by means of indicia such as numbers, letters, etc. The device includes a rotatable mount for the cage, means to rotate the cage, and means to withdraw units from the cage in predetermined number, and to move them into an elevated display position. The device also includes means for returning the withdrawn units to the cage, and to accomplish a further mixing of the units prior to subsequent withdrawals. The device of the invention also includes a synchronizing control by which the various operations of the machine can be performed in substantially automatic fashion, and in repetitive cycles of random selections.

Two principal embodiments of the invention are illustrated. In one embodiment (FIGURES 1 to 8) all mechanisms for withdrawing and returning units to the cage, as well as all control operations, are synchronized to rotation of the cage in a single direction (counterclockwise in the drawing). In the other embodiment (FIGURES 9 to 15) the operating mechanisms and controls are synchronized to successive rotations of the cage in opposite directions, making possible a somewhat simplified control sequence.

Unidirectional Machine

Referring to the machine illustrated in FIGURES 1 to 8, 10 indicates a cage mounted for rotary movement above a supporting base or pedestal 12 by means of the tubular supports 14. The base 12 can provide a convenient housing for an electric motor or other power source 16 adapted to rotate the cage, and for various control apparatus as will appear. The motor 16 serves to rotate the cage (counterclockwise in FIGURES 2, 4, and 8) by means of a rotatable worm 18. The latter is operatively connected to the motor by means of the rotary flexible cable 22. The cage is provided with cylindrical hubs 24 which are journaled in brackets 20 carried by the supports 14. Secured to one of the hubs is a gear 26 adapted to mesh with the worm 18. The cage is thus journaled for rotation about a horizontal axis extending through the hubs 24, and in response to energization by the motor 16.

The cage 10 is preferably of open framework construction and, in the illustrated apparatus, comprises a plurality of spokes 27 secured at their inner ends to the hubs 24 and at their outer ends to the annulus or ring 28. This construction permits visual inspection of the plurality of spherical units within the cage. The cage is also provided with one or more baffles 30 so that rotation of the cage accomplishes a thorough mixing of the units contained therein.

To provide for a random withdrawal of units from within the cage, the ring 28 is provided with a plurality of discharge outlets 32 spaced about its periphery. Preferably these outlets are fitted with tapered metering devices 34, adapted to permit the successive discharge of units one at a time.

Figure 4:
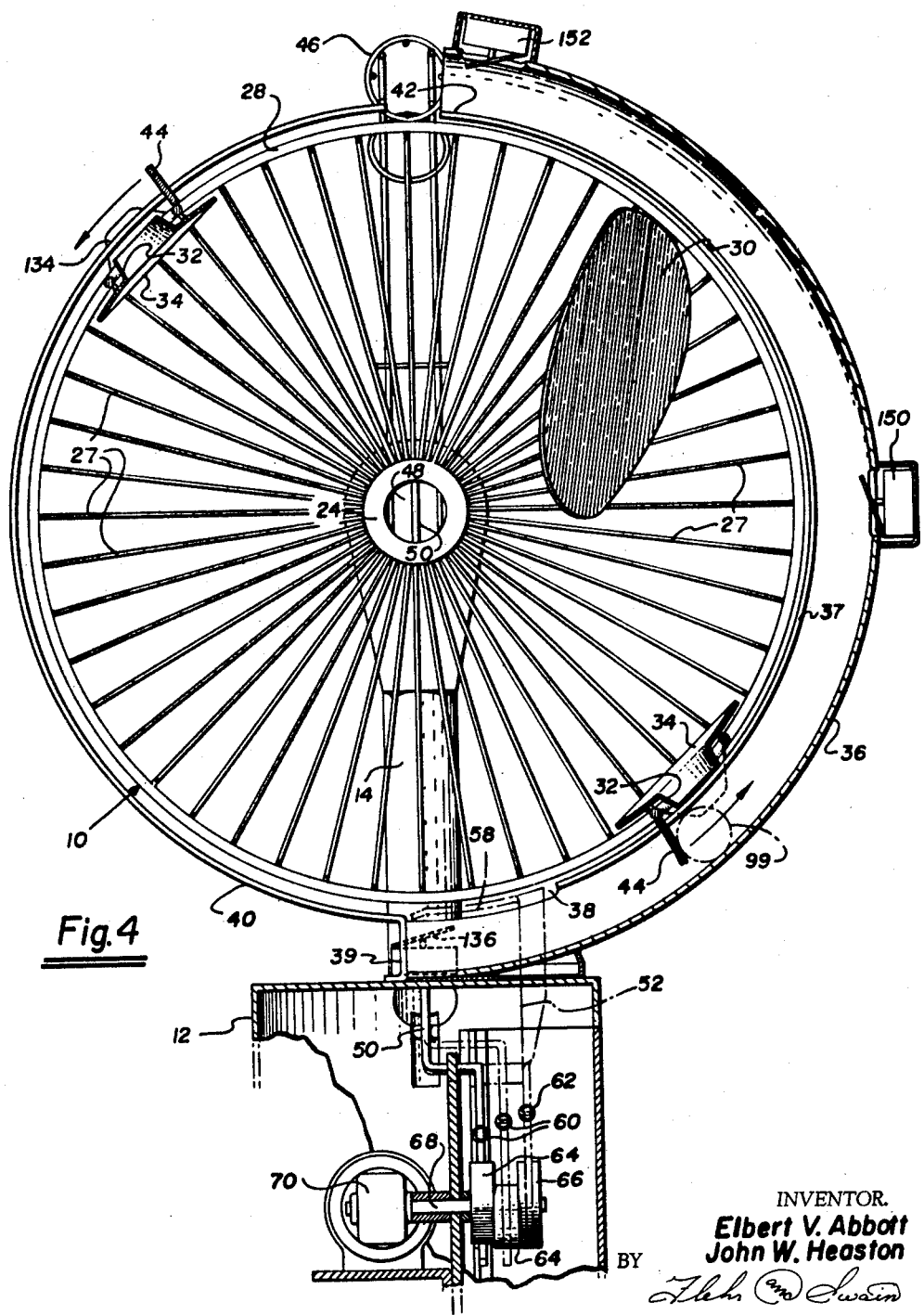
FIGURE 4 is an enlarged detail view in section and in elevation along the line 4—4 of FIGURE 1.

Referring particularly to FIGURE 4, units discharged from the cage are received in a guide way or channel 36 extending from the point of discharge at the bottom of the cage to a display position at the top of the cage. The channel 36 can be conveniently constructed to provide an elongated slot 37 on the side towards the cage, terminating in an enlarged discharge opening 38 adjacent the bottom of the cage. The lower end of the channel 36 is partially closed by a flanged portion 39 of a semicircular mounting bracket or support 40 for the upper end 42 of the channel 36. This portion 39 is so constructed that it will prevent the accidental loss of units discharged into the channel without obstructing the passage into the channel of flexible protuberances 44 positioned immediately behind the discharge openings 32. These protuberances may be resilient flaps, springs or other suitable means for engaging the units in the channel, and serving to convey the units upwardly into an elevated display position within the guide means. It will be understood that as an opening 32 is rotated into position adjacent the discharge opening 38, a unit will drop into the channel 36 and immediately be engaged for conveyance by a protruding spring 44. As each spring 44 is free to move in the slot 37, the unit will be moved upwardly thereby at the speed of rotation of the cage.

Above the cage, the guide way divides into a pair of return channels 46. These channels are preferably of open framework construction so as to reveal the identifying indicia normally carried by each of the units. These channels 46 extend downwardly about the cage at substantially right angles to the discharge channel 36 and into return positions immediately adjacent the cylindrical openings 48 of the hubs 24. The passages 48 are of greater diameter than the discharged units so that the latter may be returned to the interior of the cage by movement through the hubs.

It is a feature of the invention that gate means are associated with the various channels so that units can be withdrawn in predetermined number through the channel 36, retained for as long as desired in display positions in the return channels 46, and then returned to the cage for mixing and subsequent withdrawal. The gate means employed with the machine of FIGURES 1 to 8 comprise a pair of elongated pivot arms 50 movable into obstructing positions in the return channels 46, and a relatively shorter arm 52 movable into an obstructing position within the discharge opening 38 of the channel 36. Each of the arms 50 is pivoted about a point 54 adjacent the upper end of the pedestal 12 and is mounted for movement between a closed or obstructing position (full lines in FIGURE 3) and an open or non-obstructing position (dotted lines). The pivot arm 52 is similarly pivoted about a point 56 so as to move the gate portion 58 between closed (obstructing) and open (non-obstructing) positions within the discharge opening 38.

Figure 3:
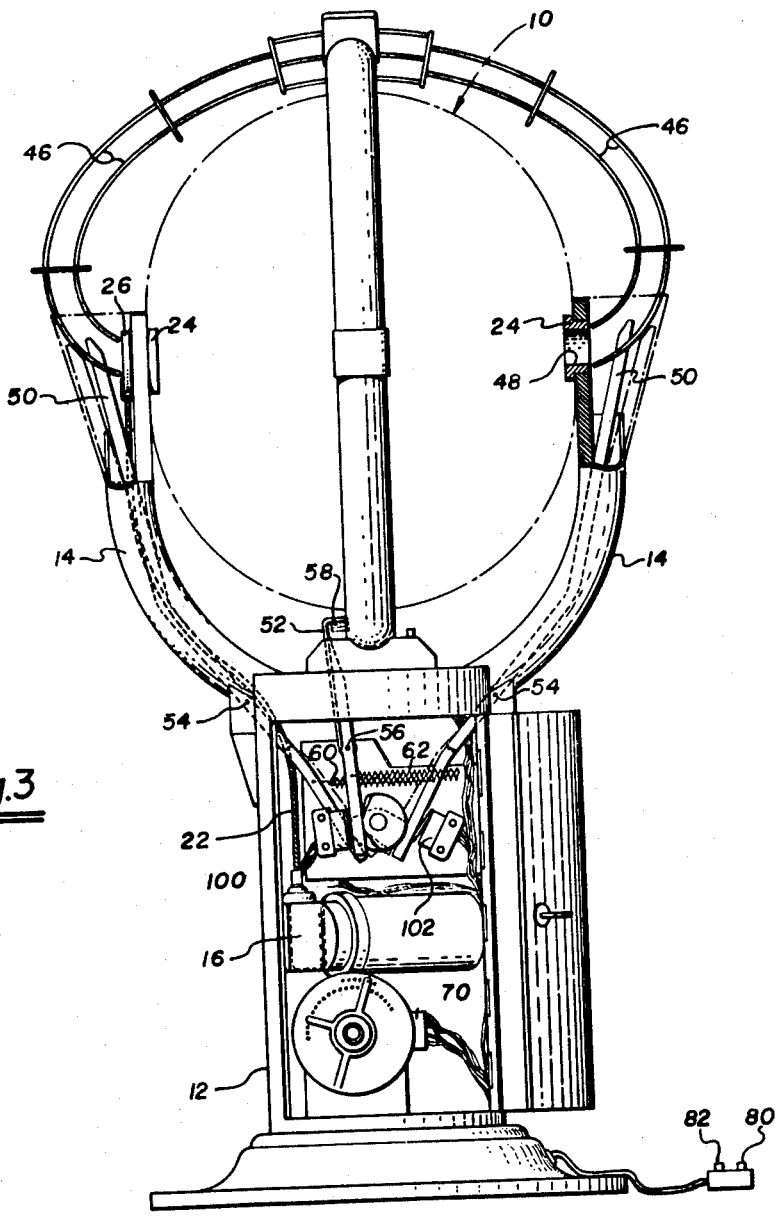
FIGURE 3 is a view in rear elevation thereof, taken along the line 3—3 of FIGURE 2.

As best seen in FIGURE 3, the return gates 50 are normally pivoted into the open (dotted line) position by means of a spring or other resilient means 60 connecting the lower ends of the pivot arms. The discharge gate 52 is likewise normally pivoted into the open position by means of a spring 62 attached between its lower end and the interior of the pedestal. This position of the gates corresponds to an operating cycle of the machine wherein the units have been discharged from the display channels 46 into the interior of the cage, for mixing, but are prevented from entering the discharge channel 36 by the gate 52.

Figure 5:
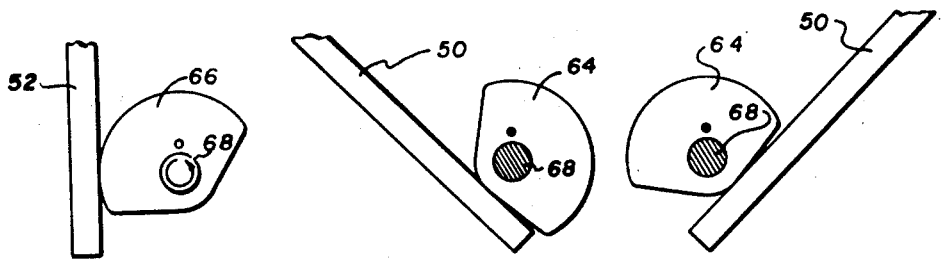
FIGURES 5 to 7 are detail views of portions of a control mechanism useful with the embodiment of FIGURE 1, and showing separate stages in its operation.
Figure 6:
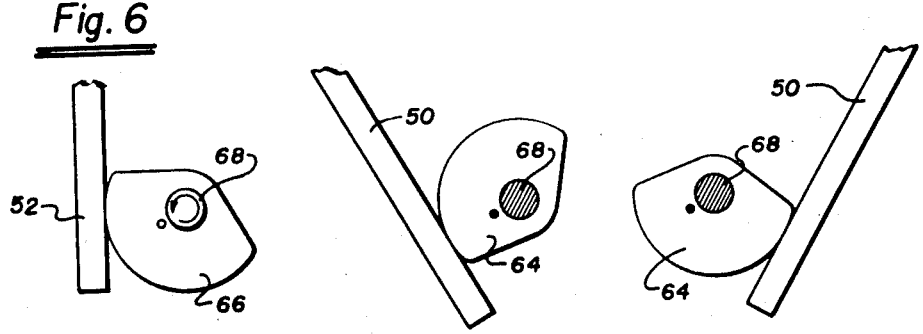
Figure 7:
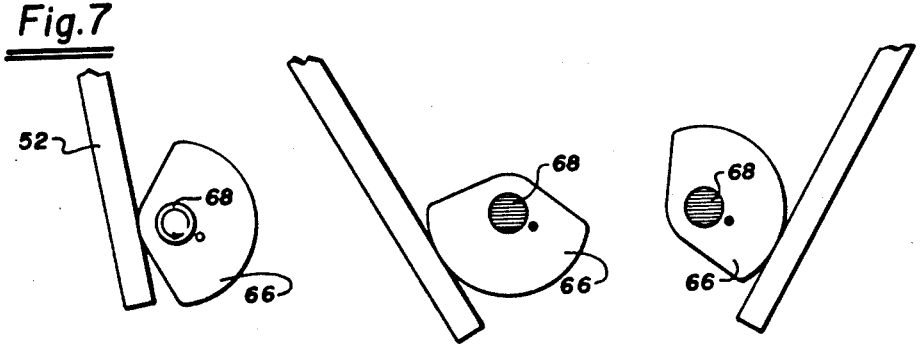

In the apparatus of FIGURES 1 to 8, the functioning of the gates 50 and 52 is controlled by means which synchronizes their operation in accordance with various desired operating cycles of the machine. Specifically a rotary cam is associated with each of the gate arms. Thus as illustrated schematically in FIGURES 5 to 7, each of the arms 50 is controlled by a rotary cam 64 and the arm 52 by the cam 66. FIGURE 5 corresponds to a position of the cams wherein the gates 50 are being held in open position by the spring 60, and the gate 52 is held in closed position by the cam 66. FIGURE 6 illustrates a position of the cams wherein the gates 50 have been moved into a closed position whereas the gate 52 remains in closed position. FIGURE 7 illustrates a further position of the cams wherein the gates 50 are retained in closed position but the cam 66 has rotated to permit spring 62 to open the gate 52. This latter position is the one also illustrated in FIGURE 3. It will be understood that each of the cams 64, 66 can be conveniently positioned on a single cam shaft 68, and rotated simultaneously by an electric cam motor or other power source 70 (FIGURE 4). In general, the function of the cams is to pivot the gates 50 into closed position and to permit opening of gate 52 by spring 62 until such time as units are carried into a display position in the return channels 46. Thereafter the cams function to permit opening of gates 50 by spring 60 and to close the gate 52 to permit mixing of the units prior to subsequent selection in repetitive cycles. While it is of course possible to independently energize the separate motors 16 and 70 to position the gate means 50, 52, and to rotate the cage in carrying out the selective operations of the machine, the present invention contemplates that all such operations be carried out substantially automatically by means of a suitable control.

Figure 8:
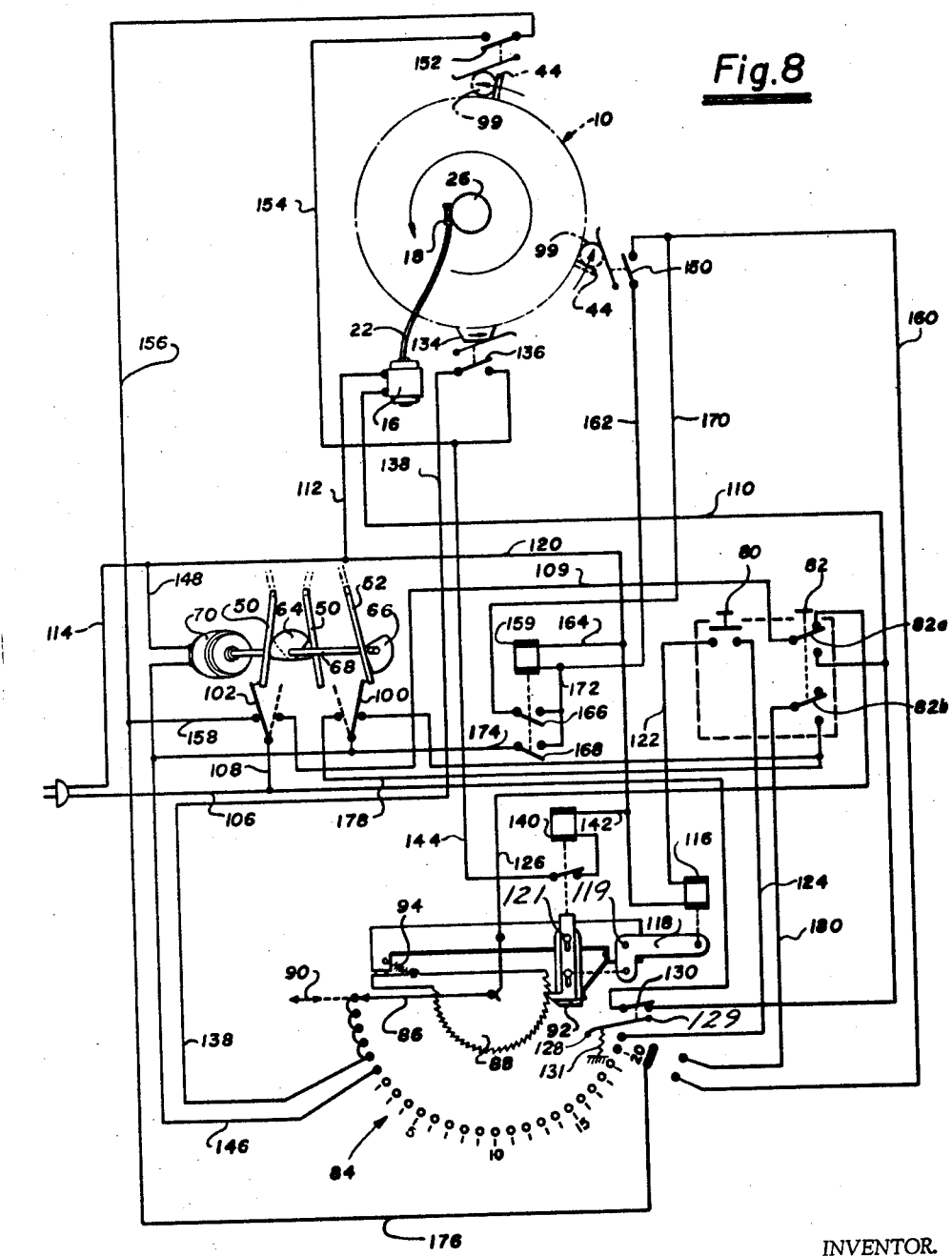
FIGURE 8 is a schematic representation of a control system for the device of FIGURE 1.
Figure 9:
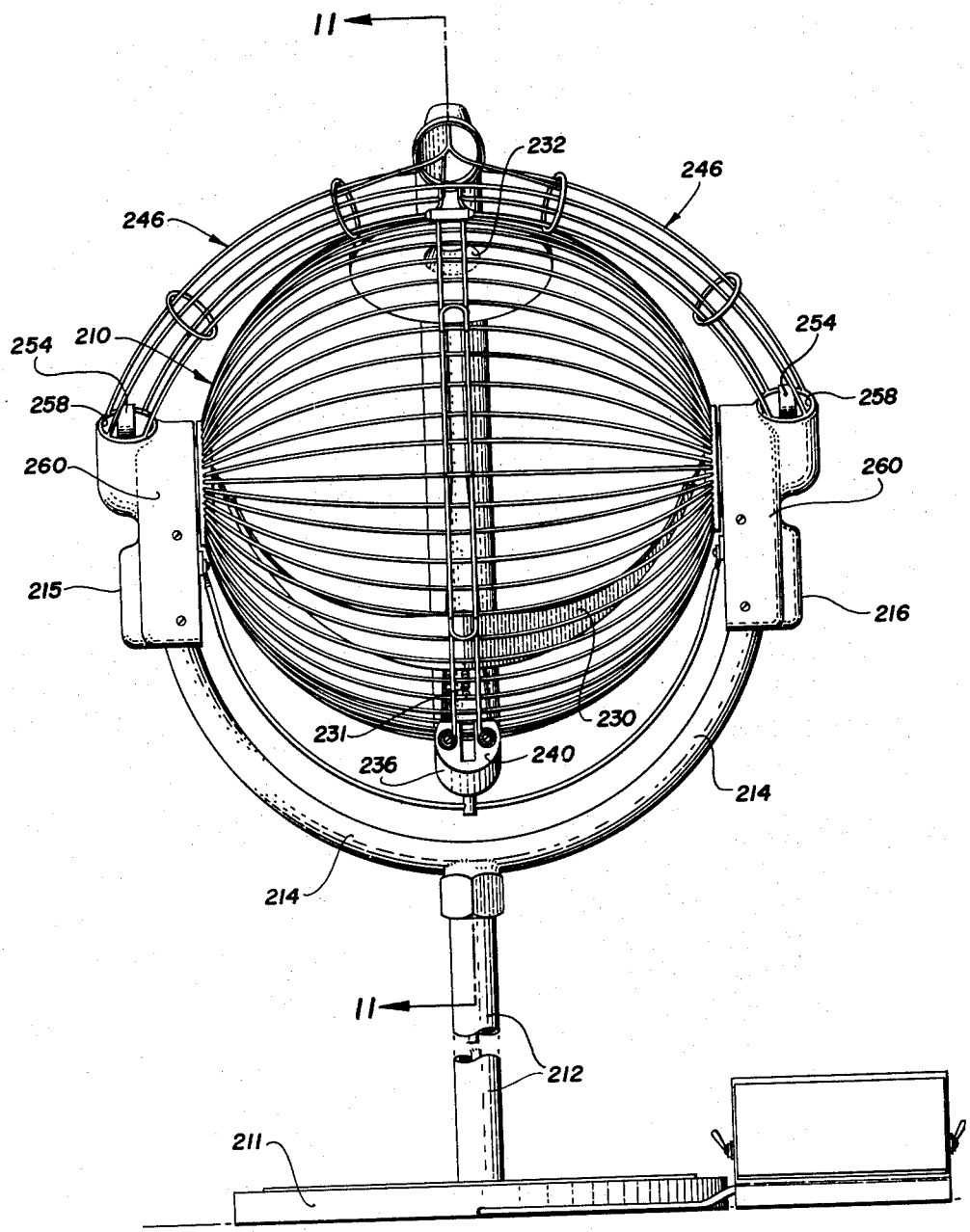
FIGURE 9 is a view in front elevation similar to FIGURE 1 of a modified embodiment of the invention.

FIGURE 8 illustrates a semi-automatic control system for the unidirectional machine, adapted to carry out a typical operation in accordance with the invention. Specifically this control permits an operation involving a "draw" cycle, during which twenty units can be withdrawn from the cage and conveyed to a display position in the channels 46, a "dump" cycle in which the withdrawn units can be returned to the cage, and a "mix" cycle during which the withdrawn units can be mixed with the remaining units to insure a completely random selection during the next "draw" cycle. The operation is "semi-automatic" in the sense that the draw cycle is initiated by depressing the button 80 whereas the dump and mix cycles are initiated by depressing the button 82.

Essentially the control system includes separate circuits including main and auxiliary circuits for the cage motor 16, for the cam motor 70, and for a step counter indicated generally at 84. The step counter illustrated includes a counter arm 86 rotatable with the ratchet 88, and movable through a mix cycle of five steps and a count cycle of twenty steps. The counter also includes a switch 90 movable with the arm 86 into circuit energizing positions at the nineteenth and twentieth counts (twentieth and twenty first contact positions, as identified below the couner). The ratchet 88 is moved in stepwise fashion by the pawl 92, and is returned to zero position by the spring or other biasing means 94.

For purposes of explaining the operation of the control illustrated in FIGURE 8, it will be assumed that the cage is filled with a substantial number of spherical balls 99, and that twenty such balls are to be selected at random and conveyed to an overhead position of display in the channels 46. It is further assumed that the machine has completed the "draw" and "dump" cycles and is off. The switch 100 is therefore in dotted line position corresponding to a closed position of the cam 66 and associated gate 52, and the switch 102 is also in dotted line position corresponding to an open position of the cams 64 and gates 50 (FIGURE 5). This means that the balls have been dumped into the cage from the channels 46 but cannot exit from the cage through the bottom discharge outlet 38. At this stage of the operations, the cage motor 16 can be manually energized for mixing by means of the button 82 for as long as desired. Energization of the cage motor for this purpose is by means of a circuit comprising the lines 106, 108, switch 102 (dotted position) line 109, switch 82a (depressed) and lines 110, 112, 114.

The "draw" cycle is initiated by depressing the button 80 to energize the reset coil 116. Power is supplied to this coil through the lines 114 and 120 leading to the coil and line 122, the button 80, line 124, counter arm 86 (at twenty first contact position), line 126, switch 82a (normally biased closed), line 109, switch 102 (dotted position) and lines 108 and 106 returning to the power supply. The effect of energizing reset coil 116 is to pivot the lever 118 about the pivot 119 to thereby pivotally retract the pawl 92 about its pivot 121. Retraction of the pawl 92 permits the spring 94 to return the counter to zero position. The return movement of the counter releases the lever 128 so that it pivots in a counterclockwise direction about the pivot 129, in response to the pressure of spring 131, causing switch 130 to assume the closed position shown in FIGURE 8. Switch 130 in turn energizes the circuit for the cage motor 16 comprising the lines 114, 112, 110, switch 130 and line 106. Movement of the counter arm 86 also breaks the circuit for the reset coil 116 so that the pawl 92 and lever 118 assume the position illustrated in FIGURE 8. At this point the cage commences continuous rotation for purposes of mixing the balls with the result that the actuator 134 engages and depresses the lever for switch 136 with each cycle of rotation. This energizes the circuit for the step coil 140 through the lines 114, 120, 142, 144, switch 136, line 138, counter arm 86 and back through the switches 82a and 102 to the power supply. Each rotation of the cage therefore causes the counter 86 to be advanced one step until on the fifth rotation of the cage the counter moves to the first contact position in the counting cycle. At this point the circuit through the line 138 to the switch 136 has been broken and the cam motor 70 energized instead through the lines 146, 148 and 114. The cam motor now rotates the shaft 68 to close the return gates 50 and to open the discharge gate 52. The position of the cams at this stage is represented in FIGURE 7. At the same time, the switches 100 and 102 are moved from the dotted to the full line positions.

The opening of the gate 52 permits the actual draw cycle to commence, with balls 99 falling one by one through the opening 38 into the channel 36 and being advanced upwardly past the microswitch 152. (The switch 150 is inactive at this point). The switch 152 functions to energize the step counter coil 140 through the circuit 114, 120, 142, 144, 154, switch 152, lines 156, 158, switch 102 (now in full line position) and lines 108 and 106. Each time a ball 99 is moved upwardly to close switch 152, the step coil functions to move the counter 86 up one step. At count nineteen (contact position 20), the ganged switch 90 functions to close the circuit through the switch 150 to energize the relay coil 159 (i.e. through switch 90 to line 160, switch 150 and line 162 to the relay coil and lines 164, 120 and 114 to the power supply). The effect is that the twentieth ball functions first to close switch 150, thereby energizing the relay 159 to close the switches 166 and 168. Switch 168 starts the cam motor 70. Switch 166 holds the circuit for switch 168 by energizing the bypass lines 170, 172 to the relay. The cam motor is now energized by the circuit comprising the lines 114, 148, 174, switches 166 and 168, lines 170 and 160, switch 90 and lines 176 and 158, switch 102 and lines 108 and 106. The cam motor functions at this stage to close the discharge gate 52 before another ball can exit through the bottom passage 38. The twentieth ball next engages the lever for switch 152, causing the counter to move to the twenty-first contact position. However, the cam 66 in rotating to close the gate 52 (i.e. to the position of FIGURE 6) has moved the switch 100 from the illustrated full line to the dotted line position. At the same time, movement of the counter arm 86 into the twenty-first position causes it to engage the lever 128, pivoting it upwardly about the pivot 129 to open switch 130, thereby breaking the cage circuit and stopping further rotation of the cage. The machine is now in position with the return gates 50 in closed position, twenty balls in display position in the overhead channel 46, and the machine stopped.

After the random selections made by the machine have been recorded or otherwise noted, the balls must be returned or "dumped" back into the machine prior to the next mix and draw cycles. This is accomplished by depressing button 82 to close switch 82b. The cam motor is now energized through the lines 114, 148, 174, switch 100 (dotted line position) line 178, switch 82b, line 180, switch 90, lines 176, 158, switch 102 (full line position) and lines 108 and 106. This has the effect of causing the cam motor to rotate the cams 64 to open the return gates 50 and thereby return the balls to the cage. The positions of the cams at this stage are represented in FIGURE 5. The switch 102 is also simultaneously moved from the full line to the dotted line position. The machine is now in its initial position and can be energized either in a "mix" cycle by the button 82 or in a "draw" cycle by the button 80.

The overall operation of the machine illustrated in FIGURES 1 to 8 can now be briefly summarized as follows: It is assumed that the machine has completed the "draw" and "dump" cycles and is off. Preliminary mixing can be accomplished by depressing the button 82. The draw cycle can be initiated by depressing the button 80. This energizes the reset coil 116 to zero the counter 84 and to start the cage motor 16. The cage rotates five times in a "mix" cycle with the actuator 134 engaging the switch 136 at each rotation to step the counter arm 86 up to the first contact position in the "draw" cycle. This new position of the counter arm energizes the cam motor 70 to close the return gates 50 and to open the discharge gate 52. Balls can now fall in random fashion through the opening 38 into the discharge channel 36. Each ball is immediately engaged by a spring 44, and moved upward and then sideways into a display position in one of the return channels 46. (Dotted position of the balls in FIGURE 1). Switch 152 energized by the last operation of the cam motor, now causes the counter to advance one step with each movement of a ball past the switch 152 and into a display position within a channel 46. The illustrated control system is so constructed that movement of the twentieth ball past the switches 150 and 152, functions to break the circuit for the cage motor 16. The cage thus ceases rotation. The balls however remain in a display position, indicating visually the random selections made by the machine. The button 82 can now be depressed to energize the cam motor to open the return gates 50, thereby allowing the selected balls to return to the interior of the cage. In this general fashion, the balls can be mixed, twenty balls selected in random fashion, the balls positioned for display and then returned to the cage, with the entire operation being capable of being repeated as many times as desired by the operator.

*Reversible Machine*

The modified embodiment of the machine illustrated in FIGURES 9 to 15 is similar in most of its constructional details to the machine just described. Thus, cage 210 is mounted for rotary movement above a supporting base 211 and pedestal 212 by the tubular supports 214 and housings 260. However, a pair of motors 215 and 216 is provided, each operatively connected with one of the hubs of the cage. The motor 215 serves to rotate the cage in one direction during a "dump" and "mix" cycle (clockwise as in FIGURES 10 to 13) whereas the motor 216 serves to rotate the cage in an opposite direction in a "draw" cycle (counterclockwise in FIGURES 10 to 13).

Referring to FIGURE 14, each of the motors employs a main winding 217 electrically coupled through a core 217a to a rotor 218 on the stub shaft 219. The shaft 219 has an inner splined end which is axially shiftable with the shaft between an engaged and a disengaged position relative to a gear train (not shown) within the gear box 220a. The shaft 219 is normally biased outward to a disengaged position by a spring 219a. Upon energization of the motor, the shaft 219 is moved axially inward to an engaged position with respect to the gear train, which in turn is coupled to the shaft 220 of pulley 221. The latter carries a flexible drive belt 222 which is reeved about one of the cylindrical hubs 224 of the cage 210. Energization of the motor will therefore cause the cage to rotate about a horizontal axis extending through the hubs 224, whereas de-energization of the motor will permit the spring loaded shaft 219 to withdraw and the motor to become disengaged from the cage. As indicated above, the motors 215 and 216 are mounted on opposite sides of the cage so that the motor 215 serves to rotate the cage in one direction and the motor 216 to rotate the cage in an opposite direction. However, the spring loading of the shafts 219 insures that only one of the motors will be operatively engaged to rotate the cage at a time.

The cage 210 is preferably of open framework construction, similar to the cage 10 previously described, employing a similar discharge outlet 232. In addition, as will be later described, a single baffle 230 supported by a plurality of resilient means (as at 231) serves to provide a unique drop mixing of the units contained within the cage which is particularly synchronized with the operation in the draw cycle.

Figure 11:
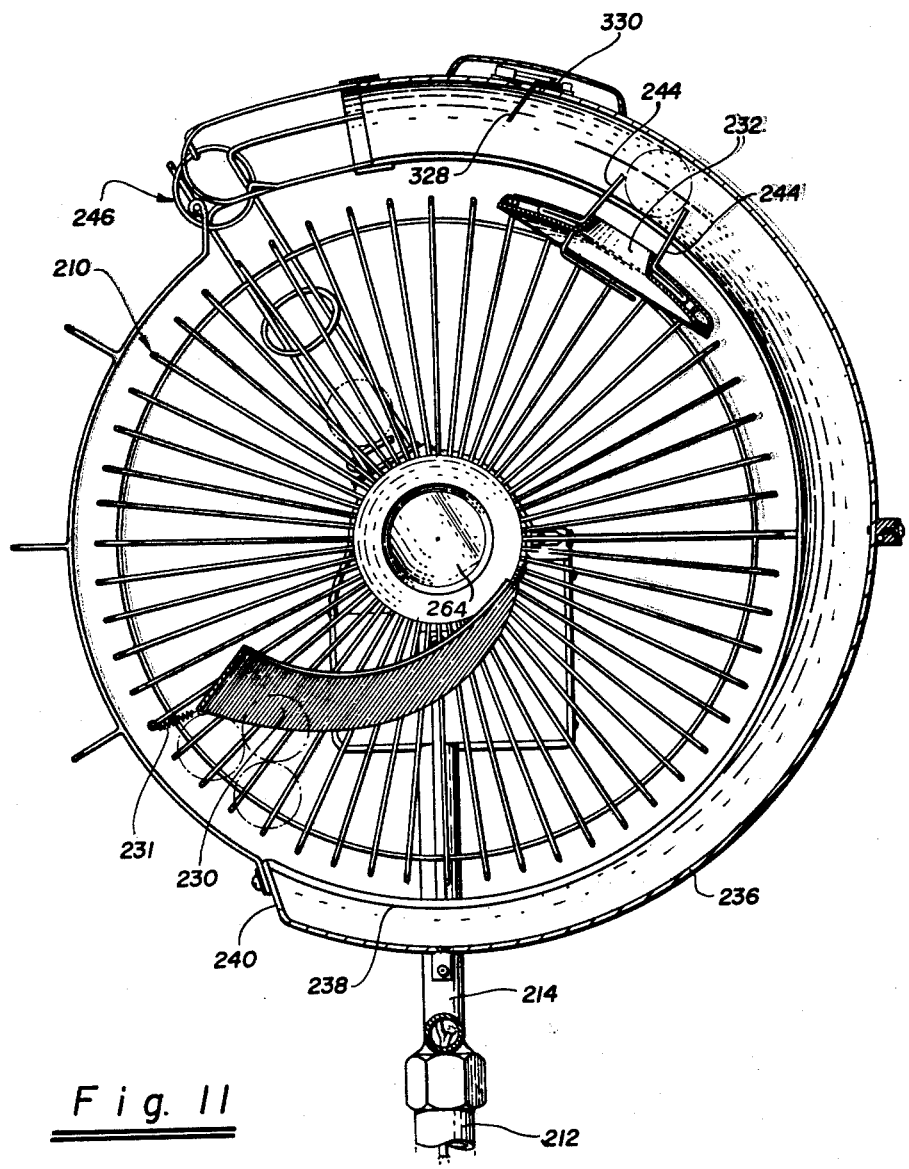
FIGURE 11 is a view in section along the line 11—11 of FIGURE 9, illustrating one stage in the operation of the machine.
Figure 12:
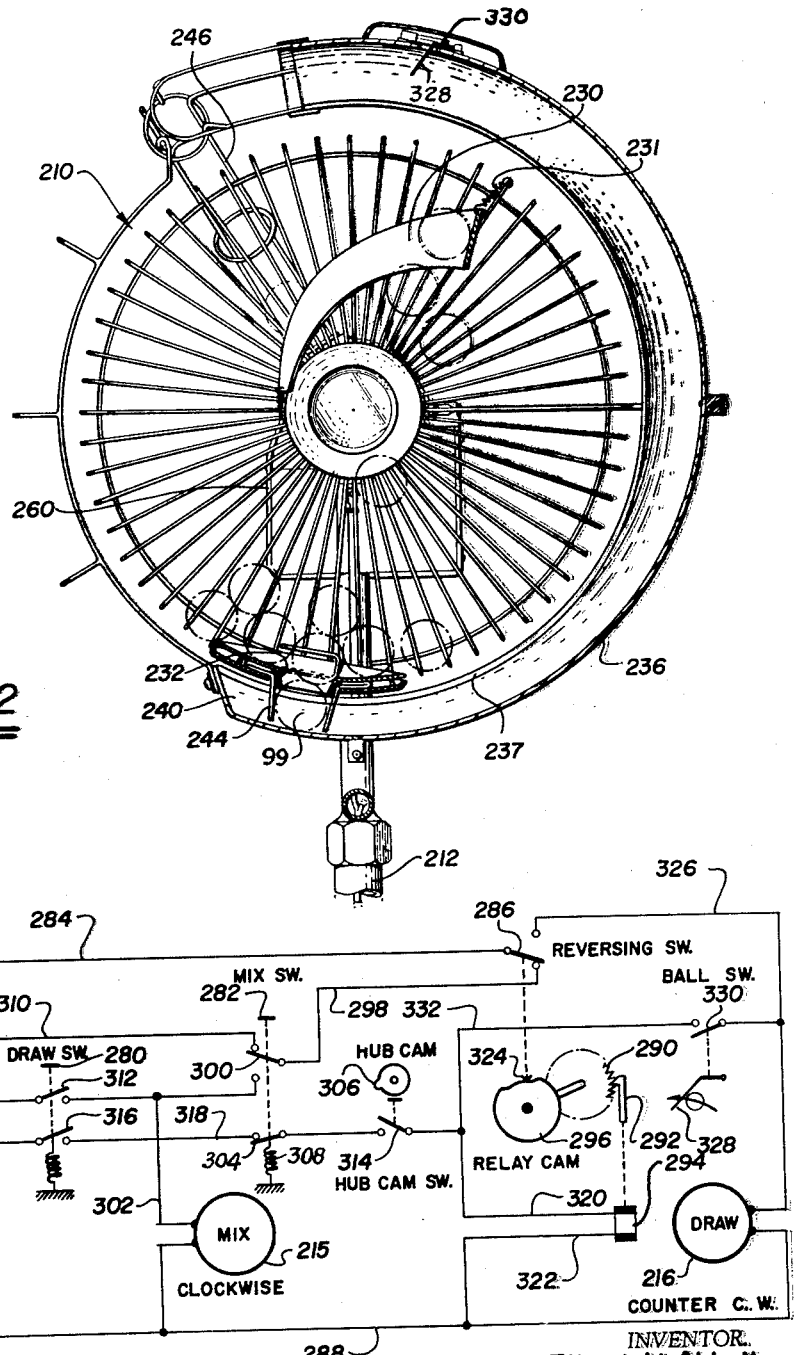
FIGURE 12 is a view in section, similar to FIGURE 11, illustrating a later stage in the operation of the machine.

As noted above, withdrawal of units from within the cage during the "draw" cycle occurs only during the rotation of the cage in a counterclockwise direction. With reference to FIGURES 11 and 12, units discharged from the cage pass through the cage discharge 232 into a guide way or channel 236 at a discharge point adjacent the bottom of the cage. The channel 236 can be similar in construction to the channel 36 described in the embodiment of FIGURES 1 to 8, and is constructed with converging flanges 237 adapted to cooperate with resilient flaps or other protuberances 244 on the cage which serve to convey the units upwardly in the channel 236 into an elevated position of display within the side or return channels 246.

It is a feature of this embodiment that the flaps or protuberances 244 are inoperative during a clockwise or mixing rotation of the cage due to cooperation between these flaps and the tapered wall 240 provided at the end of the channel 236. As best seen in FIGURE 11, this end wall serves to deflect upwardly and thereby eject any balls inadvertently passing through the opening 232 of the cage into the discharge guide channel 236, during the "mix" cycle. In a preferred embodiment, the end wall is slotted to permit passage of the flaps 244, although this is not necessary. In any event, this modified construction eliminates the need for a separately controlled discharge gate mechanism in the discharge channel 236 similar to that employed in the previously described embodiment (e.g. pivot arm 52 and cam 66), and consequently permits a much simplified control sequence.

Referring to FIGURES 13 and 14, a modified gate mechanism 250 is mounted on each of the hubs 224 of the cage for the purpose of retaining the withdrawn units in display position within the channels 246. As illustrated, each of the gate means 250 comprises a curved plate or bracket 254 mounted on a slip ring 256 frictionally engaged on a peripheral portion of the hub 224. Thus, as viewed in FIGURE 13, counterclockwise movement of the drum will cause the gate element 254 to move into an obstructing position within the return channel 246, (full line position). Such position occurs during a "draw" cycle of the machine. Upon clockwise rotation of the cage, the elements are moved by frictional engagement of the rings 256 into a non-obstructing position (dotted line position).

In the illustrated apparatus, the extent of pivotal movement of the gate means 250, between closed (obstructing) and open (non-obstructing) positions, is determined by physical engagement of the gate elements 254 within return openings 258 in the housings 260 (note FIGURES 13 and 14). However, any suitable mechanism to limit the movement of the gate means 250 can be employed, for example, fixed stops.

Figure 10:
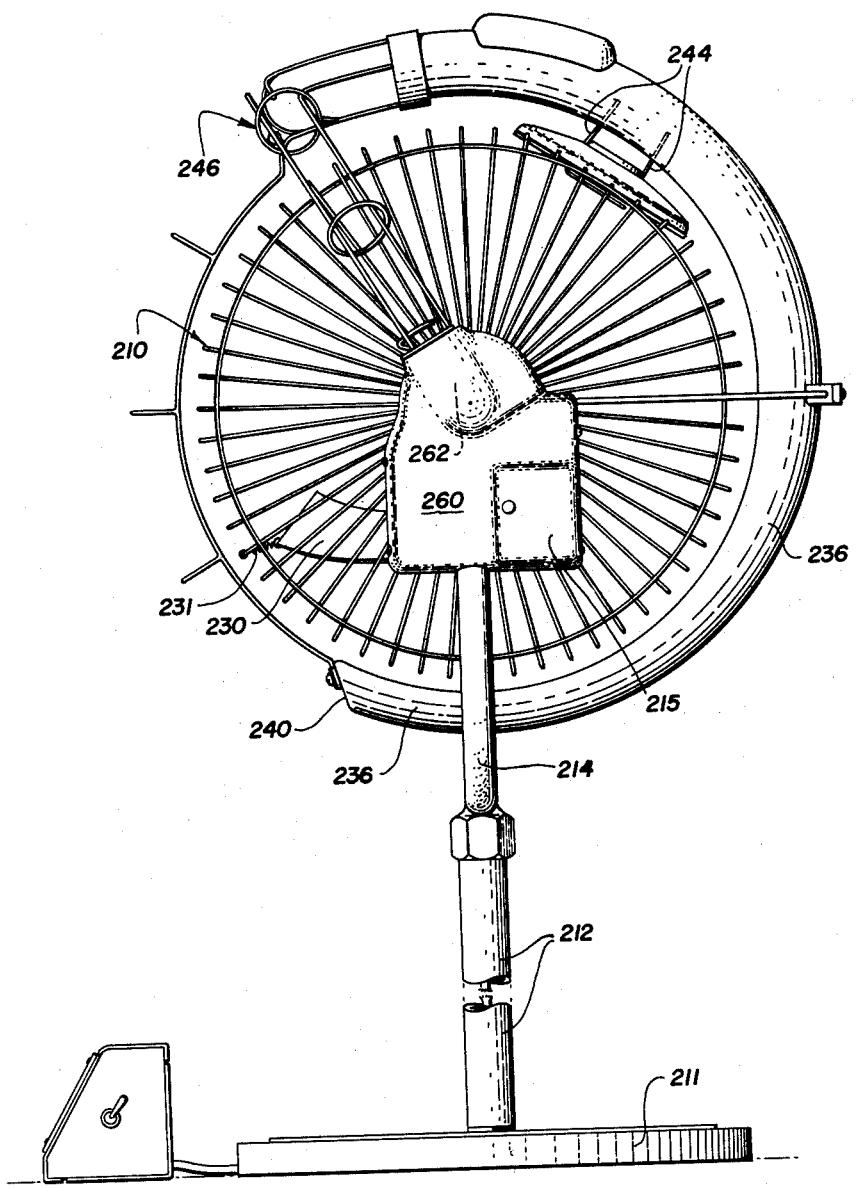
FIGURE 10 is a view in side elevation thereof.

With reference to FIGURES 10, 11 and 14, the housings 260 may be suitably contoured to provide return passageways 262 adapted to cooperate with cylindrical openings 264 within the hubs 224 of the rotatable cage. The housings 260 therefore constitute a portion of the return passageways by which the units 99 can be returned through the hub openings 262 to the interior of the cage.

Figure 15:
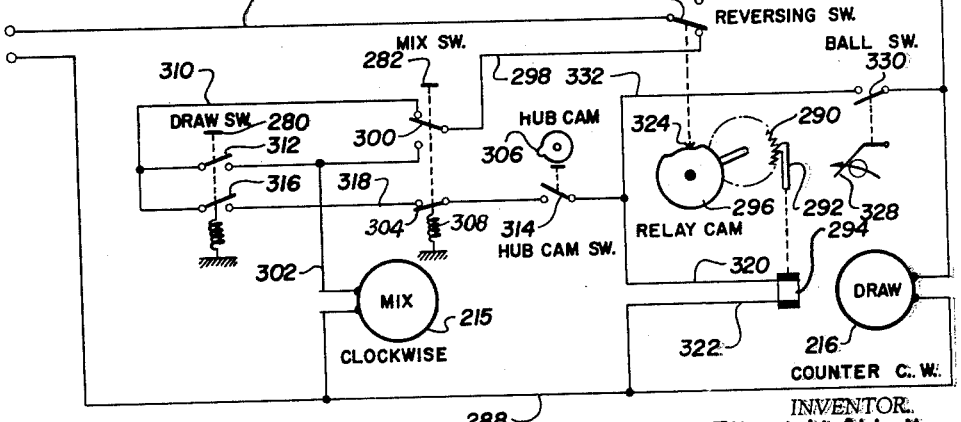
FIGURE 15 is a schematic representation of a control system for the device of FIGURE 9.

FIGURE 15 illustrates a simplified, semi-automatic control adapted for use with the modified embodiment of FIGURES 9 to 15. This control performs all the operations of the previously described control (FIGURE 8) including a "draw" cycle wherein twenty units are withdrawn from the cage and conveyed to a display position within the channels 246, a "dump" cycle during which the withdrawn units are returned to the cage, and a "mix" cycle in which the returned units are thoroughly mixed with the remaining units for further random selection. As before, the control employs a draw switch or button 280 which initiates the draw cycle, and a mix switch or button 282 which initiates the dump and mix cycles.

The modified control system employs a single circuit which alternately supplies power through the lines 284 and 285, and a reversing switch 286, to energize either the mix motor 215 or the draw motor 216. The control also employs a rotatable step counter 290 in the form of a rotatable ratchet which is movable through a mix and dump cycle of five steps, and a count cycle of twenty steps, in substantially the sequence previously described. The counter 290 is actuated by a pawl 292 in response to pulsing of a relay coil 294, and serves to simultaneously rotate a relay cam 296 in stepwise fashion to shift the reversing switch 286 at appropriate points in the operating cycle. As will appear, a complete operating cycle is accomplished by a single rotation of the step counter 290 and associated relay cam 296.

To explain the operation of the modified control of FIGURE 15, it may be assumed that the cage contains a quantity of spherical balls 99 and that the machine has just completed a "draw" cycle and is off. In this condition of the machine, represented at FIGURE 15, the mix switch 282 can be depressed to energize the mix motor 215 through the line 298, switch 300 and line 302 to rotate the cage in a clockwise direction. This direction of rotation serves to open the frictionally actuated gate means 250, and to return any balls 99 in the display position to the interior of the cage 210. Preferably the button 282 is spring loaded, as at 308, so that mixing will continue only as long as the button 282 is held in the depressed position. It will be noted that depressing the button 282 to close switch 300 also causes ganged switch 304 to open. This insures that a cam 306 provided on the hub of the cage (FIGURE 13) will be incapable of energizing the pulse relay coil 294, for example, through inadvertent actuation of the draw button 280 simultaneously with the mix button 282.

After an appropriate period of mixing, the "draw" cycle is initiated by depressing the button 280 at a time when the mix button is in the up position. Initially the mix motor is energized to rotate the cage in a clockwise direction through line 298, switch 300, line 310, switch 312 and line 302. At the same time, the hub cam switch 314 (FIGURE 13) is energized through the switch 316, line 318 and switch 304. Upon completion of the first rotation of the cage, the hub cam 306 serves to close switch 314 to energize the pulse relay coil 294 through the lines 320 and 322. The instantaneous energization of the coil 294 causes the pawl 292 to advance the step counter one step and to simultaneously rotate the relay cam 296 through the same arc. On the fifth rotation of the cage (corresponding to the fourth pulse of the coil 294) the relay cam 296 moves into a position causing the cam follower 324 to elevate the reversing switch 286 into a position energizing the line 326. As a result, the mix motor 215 is immediately cut out and the draw motor energized to rotate the cage in a reverse or counterclockwise direction. The draw cycle now commences.

As described previously, counterclockwise rotation of the cage causes the friction rings 256 to move the gate means 250 into a closed position within the return passages 246. It also permits individual balls 99 to be dicharged into the channel 236 (FIGURE 11) where they are engaged by the flexible protuberances 244 and advanced upwardly (FIGURE 12) for discharge into the pair of display channels 246. It also causes each ball being so moved through the channel 236 to engage a lever 328 controlling the operation of switch 330 (FIGURES 11, 12 and 15). The latter functions upon each passage of a ball to energize the pulse relay coil 294 through the lines 332, 320 and 322, to simultaneously advance the step counter 290 and associated relay cam 296. This sequence continues automatically so long as the cam follower 324 is engaged upon the raised portion of the cam 296. The cam 296 is of a configuration to permit twenty balls to pass the switch 330. At this point, the cam follower 324 drops into the depressed portion of the relay cam with a resultant reversal of the switch 286 to the position shown in FIGURE 15, causing the draw motor 216 to stop. In this control position, the cage will not rotate unless either the mix or draw button is held down manually. In either event the cage will initially rotate only in a clockwise direction to shift the gate means 250 to the dump position. Normally the operator will depress the mix button to energize the mix motor 215 in the manner previously described, causing the gate elements 254 to shift to the open (dotted line) position in FIGURE 13. The balls now return from the display position in channels 246 through the hub openings to the interior of the cage.

From the foregoing, it will be understood that the modified apparatus functions through a sequence of operations involving a reversible rotation of the cage to mix the balls, select twenty balls in random fashion for display, and thereafter to return the selected balls to the cage. With the exception of the automatic draw portion of the cycle, the entire operation is performed in semi-automatic fashion under full control of the operator, that is, the operator can interrupt the cycle at any time except during the draw cycle by releasing the mix or draw switches. The operation is also capable of being repeated as many times as desired by the operator.

While the invention has been illustrated and described in connection with the preferred embodiment, it is capable of other variations and modifications within the scope of the appended claims.

We claim:

1. In a device for the random selection of units in a predetermined number from a plurality of such units: a cage mounted for rotary movement about a horizontal axis, said cage having discharge outlet means for units to be discharged therefrom positioned on its periphery, said outlet means lying on a plane generally perpendicular to said horizontal axis, means for rotating said cage, guide means disposed exteriorly of the cage in said perpendicular plane so as to receive units discharged from the cage openings, means conveying said units upwardly into an elevated display position in said guide means, and gate means adapted to interrupt the movement of units into and out of said exterior guide means, said gate means being responsive to movement of a predetermined number of units in said guide means to hold such number of units in a display position.

2. A device as in claim 1 wherein said guide means include a channel extending from a discharge position below the cage to said elevated display position.

3. A device as in claim 2 wherein exterior return channels are provided, leading from said display position to a return position adjacent the horizontal axis of said cage.

4. A device as in claim 1 wherein said means for conveying the units upwardly in the guide means constitute a protuberance on the cage, located behind said discharge means and extending into said guide means, whereby units dropping into said guide means are pushed by said protuberance as the cage rotates.

5. A device as in claim 1 wherein said gate means are responsive to rotation of the cage in one direction to move into obstructing positions within said guide means and rotation of the cage in the other direction to move out of said guide means.

6. A device as in claim 5 wherein said gate means are frictionally engaged upon hub portions of said cage.

7. A device as in claim 1 wherein said gate means comprise pivoted arms movable into obstructing positions within said guide means.

8. In a device for the random selection of units in predetermined number from a plurality of such units; a cage mounted for rotation about a horizontal axis, said cage being provided with peripheral discharge means for units contained therein, means for rotating said cage, discharge guide means disposed exteriorly of the cage and substantially in the plane of said discharge means, means associated with the cage for conveying units discharged into said guide means upwardly into an elevated display position, return guide means communicating with said discharge guide means and with the interior of said cage, gate means disposed in said return guide means to prevent the return of discharged units into the cage, and synchronizing means controlling the operation of said gate means, whereby units can be discharged in predetermined number into a fixed display position in said return guide means and subsequently returned to said cage for mixing, in repetitive cycles.

9. A device as in claim 8 wherein said synchronizing control means includes means for reversing the direction of rotation of the cage, and means responsive to the direction of rotation of the cage to actuate said gate means between closed and open positions.

10. A device as in claim 9 wherein said synchronizing control means includes a pair of motors, one operable to rotate the cage in one direction and the other operable to rotate the cage in an opposite direction.

11. A device as in claim 8 wherein said return guide means are disposed in a plane substantially perpendicular to the plane of said discharge guide means.

12. A device as in claim 8 wherein said return guide means communicate with return openings coinciding with the axis of rotation of said cage.

13. In a device for the random selection of units in predetermined number from a plurality of such units; a cage mounted for rotation about a horizontal axis, said cage being provided with peripheral discharge means for units contained therein, means for rotating said cage, discharge guide means disposed exteriorly of the cage and substantially in the plane of said discharge means, means associated with the cage for conveying units discharged into said guide means upwardly into an elevated display position, return guide means communicating with said discharge guide means and with the interior of said cage, gate means disposed in said discharge guide means to prevent the discharge of units into the same, additional gate means disposed in said return guide means to prevent the return of discharged units into the cage, and synchronizing means controlling the operation of said gate means, whereby units can be discharged in predetermined number into a fixed display position in said return guide means and subsequently returned to said cage for mixing, in repetitive cycles.

14. A device as in claim 13 wherein said synchronizing control means includes rotary cams adapted to project said gate means into said guide means in a predetermined sequential relationship.

15. In a substantially automatic device for the random selection of units of predetermined number from a rotating cage: means mounting said cage for rotary movement about a horizontal axis, said cage having at least one discharge outlet on its periphery, means for rotating said cage, exterior guide means communicating with said discharge opening and extending from a position below said cage to an elevated display position above said cage, means associated with said cage for conveying units discharged into said guide means upwardly into said display position, return guide means communicating with said discharge guide means and extending from said elevated position to a return position adjacent the axis of rotation of said cage, said return guide means being provided with return openings, gate means movable into said return openings to prevent the return of units into said cage, and synchronized means controlling the operation of said gate means and cage, whereby units can be discharged into said discharge guide means and moved therein to a display position in said return guide means and subsequently be returned to the cage for mixing and discharge in repetitive cycles.

16. A device as in claim 15 wherein said control means includes a counting mechanism determining the number of units discharged into said discharge guide means in a single cycle.

17. A device as in claim 15 wherein said control means includes a synchronized cam adapted to operate said gate means.

18. A device as in claim 15 wherein said control means includes a reversing switch adapted to reverse the direction of rotation of said cage.

19. In a substantially automatic device for the random selection of units of predetermined number from a rotating cage: means mounting said cage for rotary movement about a horizontal axis, said cage having discharge outlets spaced about its periphery and in substantially the same vertical plane, means for rotating said cage, exterior guide means communicating with said discharge openings and extending from a position below said cage to an elevated display position adjacent said cage, means associated with said cage for conveying units discharged into said guide means upwardly into said display position, gate means associated with said guide means and normally preventing the discharge of units into such guide means, return guide means communicating with said discharge guide means and extending from said elevated position to a return position adjacent the axis of rotation of said cage, said return guide means being provided with return openings, gate means movable into said return openings to prevent the return of units into said cage, and synchronized means controlling the operation of said gate means, whereby units can be discharged into said discharge guide means and moved therein to a display position in said return guide means, and subsequently be returned to the cage for mixing and discharge in repetitive cycles.

20. A device as in claim 19 wherein said control means includes synchronized cams adapted to operate said respective gate means in desired sequence.

References Cited in the file of this patent

UNITED STATES PATENTS

| | | |
|---|---|---|
| 2,091,883 | Rochwarg | Aug. 31, 1937 |
| 2,187,046 | McLean | Jan. 16, 1940 |
| 2,203,886 | Zamora | June 11, 1940 |
| 2,385,980 | Fostos | Oct. 2, 1945 |